United States Patent [19]
Shalaby et al.

[11] Patent Number: 6,069,192
[45] Date of Patent: May 30, 2000

[54] LOW FIBER-LOADING COMPOSITES WITH HYBRIDIZED FIBER/MATRIX INTERFACE

[75] Inventors: Shalaby W. Shalaby, Anderson, S.C.; Jacqueline M. Allan, Bowie, Md.; Meng Deng, Central, S.C.

[73] Assignee: Poly-Med, Inc., Anderson, S.C.

[21] Appl. No.: 09/172,334

[22] Filed: Oct. 13, 1998

[51] Int. Cl.[7] .................................................. C08K 9/00
[52] U.S. Cl. ................................................. 523/205; 524/8
[58] Field of Search .................................. 523/205; 524/8

[56] References Cited

U.S. PATENT DOCUMENTS

| | | | |
|---|---|---|---|
| 3,617,179 | 11/1971 | Lewis | 8/42 |
| 3,635,653 | 1/1972 | Snider | 8/21 |
| 3,926,945 | 12/1975 | Roberts | 260/205 |
| 5,491,198 | 2/1996 | Shalaby et al. | |
| 5,691,444 | 11/1997 | Shalaby et al. | |
| 5,780,580 | 7/1998 | Shalaby et al. | |
| 5,824,411 | 10/1998 | Shalaby et al. | |
| 5,834,113 | 11/1998 | Shalaby et al. | |
| 5,874,509 | 2/1999 | Shalaby et al. | |

*Primary Examiner*—Paul R. Michl
*Attorney, Agent, or Firm*—Leigh P. Gregory

[57] ABSTRACT

Disclosed are fiber-reinforced composites having untraditionally low fiber loading and a novel form of hybridized interface. Typical examples of fiber-matrix combinations capable of developing such interfaces include surface-phosphonylated ultrahigh molecular weight polyethylene (UHMW-PE) and polypropylene (PP) yarns (or fabric constructs) and epoxy resin, acrylic resin, and cement. For further improvement of the hybridized interface and the overall composite properties, the surface-phosphonylated fiber may be post-treated with reagents that will improve the abridging of the fibers to the matrix through physicochemically hybridized interfaces. Compared with composites having unmodified fiber, those based on modified ones, with or without post-treatment, exhibit a substantial increase in physicomechanical properties at exceptionally low fiber loading, ranging from about 0.1 to 35 percent by weight, preferably from about 0.1 to about 20 percent by weight, most preferably less than 10 percent by weight. Among these properties are maximum tensile strength, fracture toughness, and modulus.

25 Claims, No Drawings

LOW FIBER-LOADING COMPOSITES WITH HYBRIDIZED FIBER/MATRIX INTERFACE

BACKGROUND OF THE INVENTION

Fiber reinforced composites (FRC) are used increasingly in a wide range of applications due to the versatility they provide to the design process. By combining the properties of the constituent components, one can generate a unique set of requisite properties unattainable by the individual components alone. Among the most impressive applications of FRC are those associated with the use of (1) epoxy resins to produce laminates for aircraft. (2) cement prefabricated constructs for use in residential, industrial, and military buildings and bridges; and (3) acrylic resins in orthopedic and dental prostheses. All of these applications call for moderate to low density fibers with exceptional strength and stiffness, such as glass, carbon, aromatic polyamide (e.g., Kevlar®) and ultrahigh molecular weight polyethylene fibers.

It is also well recognized that the properties of a composite depend largely on the nature of the interface or boundary region formed between the reinforcing fibers and surrounding matrix. Consequently, it has become clear that it is critical to tailor the properties of the interface to achieve the desired properties in composites. Toward increasing the effectiveness of these fibers, there have been numerous efforts to modify the fiber surface to physicochemically integrate with the matrix, through unique interfaces which allow transferring the load from the matrix to the high strength fibers.

For glass fibers, among the most common approaches for surface modification is the use of silane coupling agents. Contemporary methods of glass surface modification entailed covalently binding polymeric chains onto the glass surface. In a novel approach to development of absorbable glass composites, polylactones have been grafted on surface-modified silicophosphate fibers. Having such a hybrid interface between an inorganic filler and organic matrix allows the development of a unique adhesive joint through chain mixing. Although many recent attempts have been made to develop unique interfaces between carbon or Kevlar® fibers and different matrices, traditional use of sizing agents of limited effectiveness still prevails.

Of all the available high modulus fiber reinforcing agents, ultra-high molecular weight polyethylene (UHMW-PE) has the most promise because of its lower density as compared with glass, carbon, and Kevlar® as well as having higher toughness than carbon and glass. However, a major drawback in UHMW-PE fibers is their hydrophobic surface and incompatibility with most organic matrices that are used in fiber-reinforced composites. To address the hydrophobicity problem, many attempts have been made to modify the UHMW-PE surface by (1) introducing amine functionalities using ammonia plasma; (2) forming hydroxylic groups by oxygen plasma or chromic etching; (3) calendaring and surface oxidation; and (4) surface phosphonylation and subsequent hydrolysis of the phosphonyl dichloride moieties. The plasma-oxidized fibers showed some improvement when used in epoxy FRC, as compared to untreated fibers.

The use of the relatively low density, ultrahigh strength, high modulus fibers in the development of high performance, fiber-reinforced composites has been viewed by many as an excellent means to produce novel materials for use in traditional industrial applications as well as novel biomedical prostheses. However, the development of such composites has been compromised by the incompatibility of the UHMW-PE surface with useful matrices and, hence, poor wetting of the fibers. This is associated with poor fiber/matrix interfaces which led to poor ability for load transfer from matrix to fibers. The low density of UHMW-PE fibers, also limited their use at the traditional high fiber loading (40%–60%). Such a situation created a need for a novel approach for producing high performance FRC using modified forms of UHMW-PE at low and exceptionally low fiber loading.

The significance of having chemically continuous or tailored interfaces to physicochemically abridge the fibers to matrix has been demonstrated earlier. Thus, a novel form of self-reinforced UHMW-PE was developed and shown to exhibit exceptional mechanical properties at fiber loading of less than 10%.

SUMMARY OF THE INVENTION

The present invention is directed to a composite which includes an organic resin matrix and a filler, wherein the filler is a polyolefin fiber construct, with the polyolefin being selected from the group consisting of polypropylene and ultra-high molecular weight polyethylene, and wherein the polyolefin fiber construct includes functional moieties covalently bonded thereto, with the functional moieties being selected from the group consisting of phosphonyl moieties and sulfonyl moieties, and a bridging agent bonded to the functional moieties.

Preferred organic resins for the matrix include acrylic resins and epoxy resins. Generally, the bridging agent employed depends on the chemistry of the matrix; however, organic diamines such as hexanediamine are useful for use with a variety of matrix compositions. Composites in accordance with the present invention may have low or exceptionally low filler loading, as compared to the 40%–60% loading in traditional composites. Preferably, the polyolefin fiber construct is less than about 35 percent by weight of the composite, more preferably less than about 20 percent by weight, most preferably less than about 10 percent by weight.

In another aspect the present invention is directed to a composite which includes a cement matrix and a filler, wherein the filler is a polyolefin fiber construct, with the polyolefin being selected from the group consisting of polypropylene and ultra-high molecular weight polyethylene, with the polyolefin fiber construct having functional moieties covalently bonded thereto, the functional moieties being selected from the group consisting of phosphonyl moieties and sulfonyl moieties. Preferably, a bridging agent is bonded to the functional moieties; most preferably the bridging agent is a multivalent metal ion. Composites in accordance with the present invention may have exceptionally low filler loading, ranging from about 0.1 to 29 percent by weight, preferably from about 0.1 to about 10 percent by weight, most preferably from about 0.1 to about 2 percent by weight of the polyolefin fiber construct based on the total weight of the composite. Preferably, the polyolefin fiber construct is less than about 35 percent by weight of the composite, more preferably less than about 20 percent by weight, most preferably less than about 10 percent by weight.

In a third aspect the present invention is directed to a method for making a composite which includes the steps of
  (a) providing an organic resin matrix
  (b) providing a filler which is a polyolefin fiber construct, with the polyolefin being selected from the group consisting of polypropylene and ultra-high molecular weight polyethylene.

(c) functionalizing the surface of the polyolefin fiber construct by covalently bonding functional moieties thereto, wherein the functional moieties are selected from the group consisting of phosphonyl moieties and sulfonyl moieties;

(d) post-treating the polyolefin fiber construct by bonding a bridging agent to the functional moieties; and (e) incorporating the functionalized and post-treated polyolefin fiber construct into the organic resin matrix.

In yet a fourth aspect the present invention is directed to a method for making a composite which includes the steps of (a) providing a cement matrix, (b) providing a filler which is a polyolefin fiber construct, with the polyolefin being selected from the group consisting of polypropylene and ultra-high molecular weight polyethylene;

(c) functionalizing the surface of the polyolefin fiber construct by covalently bonding functional moieties thereto, said functional moieties selected from the group consisting of phosphonyl moieties and sulfonyl moieties, and (d) incorporating the functionalized polyolefin fiber construct into the cement matrix.

Preferably, the present method further includes the step of post-treating the polyolefin fiber construct by bonding a bridging agent to the functional moieties subsequent to the step of functionalizing the surface of the polyolefin fiber construct and prior to the step of incorporating the fiber construct into the cement matrix. Most preferably, such bridging agent is a multivalent metal ion.

Basically, the present invention extends the use of surface-phosphonylated fibers to a new dimension for the use of high tenacity UHMW-PE and polypropylene (PP) fibers in cement and epoxy-based composites as well as biomedically significant acrylic composites having unusually high mechanical properties at fiber loading well below the traditional levels. These composites are expected to find use in several critical industrial and biomedical applications. Thus, low fiber-loading epoxy composites will find use in the aircraft, ground transportation, appliances, and sports equipment industries. More specifically, epoxy composites of this invention may be used in the production of protective ballistic shields for civilian and military personnel and armored vehicles. New applications of epoxy composites may also be created in certain segments of the construction industry. Development of mechanically superior, toughened, acrylic-based composites may lead to the production of new forms of bone-cement and load-bearing components for use in dental and orthopedic applications. Availability of a high impact, fiber-reinforced cement can lead to a new era in the construction industry. This will be particularly important in the defense related segments of this industry and rehabilitation of aging concrete infrastructure elements, as well as the installation or repair of concrete pavement. More specifically, the cement composites may be used in constructing high impact airfield runways and erosion tolerant walls for naval ports.

DETAILS OF THE INVENTION

This invention deals with fiber-reinforced composites having untraditionally or exceptionally low fiber loading and a novel form of hybridized fiber-matrix interface. Typical examples of these composites are represented by three sets of composites based on surface modified polyolefin yarns, such as PP and UHMW-PE, and epoxy resin, poly(methyl methacrylate) (PMMA) resin and cement using several forms of surface-modified fibers, with and without additional post-treatment.

Generally, the term "fiber-reinforced composites" in accordance with the present invention refers to composites which include a polyolefin fiber construct incorporated into the composite matrix. Such fiber constructs include fibers, twisted or parallel multifilament yarn, either continuous or chopped yarn, knitted fabric, woven fabric, and mixtures of chopped yarn and knitted or woven fabric, among others. Regardless of the form, the polyolefin fiber construct of the present invention is incorporated into the matrix at less than 35 percent by weight, optionally less than 30 percent by weight, optionally less than 25 percent by weight, optionally less than 20 percent by weight, optionally less than 15 percent by weight, optionally less than 10 percent by weight, optionally less than 5 percent by weight, optionally less than 3 percent by weight, optionally less than 2 percent by weight, and optionally less than 1 percent by weight. The polyolefin is selected from polypropylene of ultra-high molecular weight polyethylene.

The preferred process for surface functionalization is phosphonylation, most preferably by the method disclosed in U.S. Pat. No. 5,491,198 which is hereby incorporated herein by reference. This is to form covalently bonded, phosphonate groups (C—P(O)Cl$_2$ or its hydrolysis product C—P(O)(OH)$_2$) with the hydrolytically stable C—P linkage between the polymer main chain and the phosphonate moieties.

However, sulfonation is also within the scope of the present invention. By such process the polyolefin fiber construct is exposed, generally for about five to about twenty minutes, to a gaseous mixture of dry argon or nitrogen and sulfur trioxide in a dry glass apparatus equipped for continuous gas circulation and flow. The gas mixture is produced by passing dry nitrogen through a reservoir of fuming sulfuric acid that is separated from the sulfonation chamber by a frittered glass septum.

Generally, the bridging agents employed in accordance with the present invention are dependent on the composition of the composite matrix. Organic amines are preferred for organic resin matrices. Examples of such include difunctional diamines such as hexanediamine and polyfunctional amines such as triethylenetetramine. Other amines appropriate for use as the bridging agent of the present invention include ethanolamine, 6-amino-1-hexanol, ethylenediamine, 1,3-propanediamine, 1,4 butanediamine, 1,8-octanediamine, 1,10-decanediamine, and 1,12-dodecanediamine.

Also preferred as the bridging agents of the present invention are agents which are miscible with the matrix. Thus, various epoxies are appropriate as bridging agents for use with an epoxy matrix. The epoxy may be identical to or substantially similar to the epoxy of the matrix. That is, it surprisingly has been determined in accordance with the present invention that a functionalized polyolefin fiber construct, forms an improved interface with an organic resin matrix if the functionalized polyolefin structure is first primed with an organic substance which is chemically identical or similar to the matrix resin. It is believed that such priming improves wetting of the fiber structure by the matrix resin during composite formation. An organic substance which is substantially similar to the matrix resin is considered to be one which is soluble in or miscible with the matrix resin. When a miscible agent is employed as a bridging agent, it may be applied directly to the functionalized surface or onto a primary, underlying bridging agent such as an organic amine as described above.

For a cement matrix the preferred bridging agent is a multivalent metal ion. Preferred is $Ca^{2+}$ from calcium oxide or calcium acetate. Other multivalent metal ions which may be employed as bridging agents with a cement matrix are $Mg^{2+}$, $Zn^{2+}$, and $Fe^{3+}$ from acetates or other salts or other soluble precursors. However, it should be noted that a bridging agent is not required when the matrix is cement. Polyolefin fiber constructs which are functionalized in accordance with the present invention may be incorporated into cement matrices with or without a bridging agent. Other bridging agents may be based on organic functional compounds which are capable of bonding chemically the cement constituents.

Thus, preferred matrices for the present inventive composites are organic resin matrices such as epoxy and acrylic matrices or a cement matrix. The acrylic resin matrix in accordance with the present invention may optionally include difunctional or polyfunctional cross-linking agents. The acrylic resin can also contain from about 5 to about 85 percent of an inorganic filler such as silicon dioxide or titanium dioxide.

Testing results of composites prepared in accordance with the present invention indicate that that (1) phosphonylation of PP is more achievable and controllable than that of UHMW-PE fibers; (2) phosphonylation can result in surface microporosity; (3) surface energy of fibers increases as a result of phosphonylation and can be affected further by surface microporosity; (4) post-treatment can increase the surface energy of functionalized fibers substantially; (5) depending on the extent of phosphonylation, the fiber strength may decrease by a small fraction of its initial strength, which counterbalanced and exceeded the initial values by post-treatment; and (6) at fiber volume fractions of about 0.005 and 0.050, at least, one of each type of composite shows substantial increase in interfacial bonding as measured in terms of maximum normal stress (tensile strength, $\sigma_{max}$) using the flexural properties data from a the 3-point bend test. Further treatment of the flexural data and calculation of the area under the normal stress versus displacement curve suggests that several composites of the surface-modified fibers exhibit higher toughness than control samples (with unmodified fibers). In each group of composites (i.e., epoxy, PMMA, and cement) made with surface modified PP or UHMW-PE fibers, results demonstrate the feasibility of using surface-phosphonylation with or without post-treatment for the production of composites with noticeably improved tensile strength and impact toughness. More specifically, an analysis of PP composites data indicate that the development of surface microporosity with relatively low phosphonylation levels appear to be most pertinent to (1) their effectiveness in improving the tensile strength of the epoxy composites; (2) their effectiveness in increasing tensile strength and impact toughness of PMMA composites; and (3) their effectiveness in improving tensile strength of cement composites. Similarly, analysis of UHMW-PE composites data indicate that surface phosphonylated UHMW-PE fibers that are lightly functionalized and their post-treated forms appear to be most effective in assembling high-strength epoxy and cement composites having high impact toughness. Phosphonic-acid-bearing, highly phosphonylated UHMW-PE fibers without post-treatment may be most effective in producing high-strength composites with high-impact toughness using about 1% (by volume) fiber loading.

The following materials were employed in the Examples of the invention which are set forth below:

Epoxy resin was prepared using a two part epoxy. Part I consisted of 87/13 (w/w) Epon Resin 828 (Polysciences, Inc.)/ethylene glycol diglycidyl ether (Polysciences, Inc.) Part II consisted of diethylenetriamine (Aldrich). A ratio of 87/13 (w/w) Part I/Part II was mixed for approximately 2 min. and then centrifuged for 1 min. to eliminate small bubbles. Immediately after centrifuging, the epoxy was poured into the composite forms.

Polymethyl methacrylate (PMMA) was prepared in standard batch sizes of approximately 53 g which consisted of 51.9 g methyl methacrylate (Aldrich), 0.75 g benzoyl peroxide (Aldrich), and 0.24 g N,N-dimethyl-p-toluidine (Aldrich). The catalyst was first dissolved in the monomer, then the initiator was added. The PMMA was stirred every 10 min. and poured into the composite forms 40 min. after addition of the initiator. API Class H Well Cement (Texas-Lehigh Cement Company) was mixed in a 2:1 ratio with water. The cement slurry was stirred for 35 min. on a magnetic stir plate and then poured into the composite forms.

Polypropylene was received from Amoco as 42.5 $\mu$ diameter fibers in yarns consisting of 40 fibers.

UHMW-PE, sold under the tradename Spectra, was received from Allied Corporation as 27.5 $\mu$ diameter fibers in yarns consisting of 120 fibers.

EXAMPLES

For each of the fibers of the Examples set forth, below, phosphonylation was carried out in a one-chamber reactor in the gas phase. Phosphorus trichloride (Aldrich) was introduced into the reactor containing fibers in a pure oxygen environment. The reaction was carried out for time periods ranging from 5 to 60 min. as specified in Tables I-A and I-B, below. In most cases, as indicated in the tables, the fibers were hydrolyzed subsequent to phosphonylation by sonicating alternately in distilled water and 0.5 M hydrochloric acid (Aldrich) and finally again in distilled water.

The functionalized fibers were post-treated as described in Tables I-A and I-B. All reagents were purchased from Aldrich or Polysciences, Inc. Once treated, all fibers were air dried for approximately 15 hr. and then stored under vacuum.

TABLE I-A

Surface Functionalization and Post-Treatment of PP Fibers

| Fiber Of Ex. No. | Treatment |
| --- | --- |
| 1 | Phosphonylated 15 min. Hydrolyzed. |
| 2 | Phosphonylated 5 min. Hydrolyzed. |
| 3 | Phosphonylated 15 min. Hydrolyzed. Soaked in solution of 10% epoxy Part I in dichloromethane for 30 sec. Cured in oven at 50° C. for 2.4 hr. |
| 4 | Phosphonylated 5 min. Hydrolyzed. Soaked in solution of 10% epoxy Part I in dichloromethane for 30 sec. Cured in oven at 50° C. for 2.4 hr. |
| 5 | Phosphonylated 15 min. Hydrolyzed. Sonicated in a saturated solution of calcium oxide in distilled water for 3 min. Rinsed in distilled water. |
| 6 | Phosphonylated 5 min. Hydrolyzed. Sonicated in a saturated solution of calcium oxide in distilled water for 3 min. |

TABLE I-A-continued

Surface Functionalization and
Post-Treatment of PP Fibers

| Fiber Of Ex. No. | Treatment |
|---|---|
| | Rinsed in distilled water. |
| 7 | Phosphonylated 15 min. Sonicated in dichloromethane for 2 min. Soaked overnight in a 10% solution of 1,6-hexanediamine in dichloromethane with 1% triethylamine. Sonicated in IPA for 2 min., then distilled water for 2 min., then IPA for 2 min. |
| 8 | Phosphonylated 5 min. Sonicated in dichloromethane for 2 min. Soaked overnight in a 10% solution of 1,6-hexanediamine in dichloromethane with 1% triethylamine. Sonicated in IPA for 2 min., then distilled water for 2 min., then IPA for 2 min. |
| 9 | Phosphonylated 15 min. Sonicated in dichloromethane for 2 min. Soaked overnight in a 10% solution of 2-hydroxyethyl methacrylate in dichloromethane with 1% triethylamine. Sonicated in IPA 2 for min., then distilled water for 2 min., then IPA for 2 min. |
| 10 | Phosphonylated 5 min. Sonicated in dichloromethane for 2 min. Soaked overnight in a 10% solution of 2-hydroxyethyl methacrylate in dichloromethane with 1% triethylamine. Sonicated in IPA for 2 min., then distilled water for 2 min., then IPA for 2 min. |

TABLE I-B

Surface Functionalization
and Post-Treatment of UHMW-PE Fibers

| Fiber Of Ex. No. | Treatment |
|---|---|
| PE | Sonicated in acetone for 10 min. Dried under vacuum for 30 min. |
| Pretreat | Sonicated in dichloromethane 10 min. Dried under vacuum for 30 min. All fibers treated as described below were first pretreated this way. |
| 11 | Phosphonylated 60 min. Hydrolyzed. |
| 12 | Phosphonylated 30 min. Hydrolyzed. |
| 13 | Phosphonylated 60 min. Hydrolyzed. Soaked in solution of 10% epoxy Part I in dichloromethane for 30 sec. Cured in oven at 50° C. for 2.4 hr. |
| 14 | Phosphonylated 30 min. Hydrolyzed. Soaked in solution of 10% epoxy Part I in dichloromethane for 30 sec. Cured in oven at 50° C. for 2.4 hr. |
| 15 | Phosphonylated 60 min. Hydrolyzed. Sonicated in a saturated solution of calcium oxide in distilled water for 3 min. Rinsed in distilled water. |
| 16 | Phosphonylated 30 min. Hydrolyzed. Sonicated in a saturated solution of calcium oxide in distilled water for 3 min. Rinsed in distilled water. |
| 17 | Phosphonylated 60 min. Sonicated in chloroform 2 min. Soaked overnight in a 10% solution of 1,6-hexanediamine in chloroform with 1% triethylamine. Sonicated in IPA 2 min., then distilled water 2 min., then IPA 2 min. |
| 18 | Phosphonylated 30 min. Sonicated in chloroform 2 min. Soaked overnight in a 10% solution of 1,6-hexanediamine in chloroform with 1% triethylamine. Sonicated in IPA 2 min., then distilled water 2 min., then IPA 2 min. |
| 19 | Phosphonylated 60 min. Sonicated in chloroform 2 min. Soaked overnight in a 10% solution of 2-hydroxyethyl methacrylate in dichloromethane with 1% triethylamine. Sonicated in IPA 2 min., then distilled water 2 min., then IPA 2 min. |
| 20 | Phosphonylated 30 min. Sonicated in dichloromethane 2 min. Soaked overnight in a 10% solution of 2-hydroxyethyl methacrylate in dichloromethane with 1% triethylamine. Sonicated in IPA 2 min., then distilled water 2 min., then IPA 2 min. |

Phosphonylated and post-treated fibers as described in Tables I-A and I-B, above, were analyzed for surface energy, mechanical properties, surface morphology, and phosphorus and chlorine content. Advancing surface energy of single fibers was measured using the Whilemy technique with a Cahn microbalance (Cahn Instruments), methylene iodide and water were used as probe liquids. Mechanical properties of the yarns were measured using an 858 Minibionix (MTS) with a Lab View v 3.11 data acquisition program. The yarns were tested at a gage length of 120 mm and a displacement rate of 0.42 mm/sec. Five samples of each yarn were tested. Scaniung electron micrographs of the yarns were obtained using a JSM-IC848 Scanning Microscope (Jeol).

Analytical and testing results of phosphonylated PP fibers are summarized in Table II-A and show that (1) phosphonylation and to introduce —C—P(O)(OH)$_2$ groups increases the surface energy; a significant increase in surface energy can be realized as the phosphonylation time is increased from 5 to 15 min.; and (2) surface microporosity is created upon phosphonylation, which may also contribute to the change in surface energy at high phosphonylation levels. The predicted difference in phosphonylation levels at 5 and 15 min. phosphonylation is consistent with elemental analysis data for percent total phosphorous; 0.10% and 0.33% for the 5 and 15 min. phosphonylated samples, respectively. This is also in concert with the difference in surface microporosity as observed by SEM and the recorded decrease in tensile strength of the highly phosphonylated fibers (Table II-A).

Analytical and testing results of phosphonylated UHMW-PE fibers are summarized in Table II-B and show or suggest that (1) as-received commercial UHMW-PE fibers have a high-energy surface contaminant (or finish) that is removed by scouring or pretreatment; the surface finish was found to interfere with the phosphonylation process; (2) phosphonylation levels achieved in UHMW-PE are far less than those realized with PP; this is reflected in limited increases in surface energy (by dynamic contact angle) topography (by SEM) and the low total percent phosphorous (by elemental analysis using inductive coupled plasma) of about 0.03% and 0.08% of fibers phosphonylated for 0.5 and 1.0 hr, respectively; (3) pre-treatment unexpectedly lowers the tensile strength of the fiber, which may be related to retention of methylene chloride from the scouring step as indicated by the presence of about 0.4% chlorine (by elemental analysis) in both the 0.5- and 1.0-hour phosphonylated samples; (4) phosphonylation for 0.5 hr and 1 hr is associated with no, or indiscernible change in tensile strength of the pre-treated fibers (pre-treats), respectively; and (5) scoured (or pre-treated) fibers may have undergone some surface or bulk fibrillation which may be responsible for the decrease in strength as a result of the scouring process. Alternatively, the suspected surface finish (or contaminants) may have been used to size (or bind) an already existing fibrillar structure.

To enhance wettability and/or reaction of the phosphonylated fibers with the different matrices, both the PP and UHMW-PE fibers were post-treated with (1) a solution of the epoxy components for priming the surface with the epoxy matrix material. (2) 2-hydroxyethyl methacrylate (HEMA) to react with —P(O)Cl$_2$ groups (prior to hydrolysis) to provide reactive vinyl functionality for reaction with the matrix material, namely PMMA, as it forms; (3) 1,6-hexanediamine to anchor (through reaction with the —P(O)Cl$_2$ before hydrolysis) the reactive amine group which can react with the matrix material (epoxy or PMMA); and (4) calcium hydroxide to bind Ca$^{+2}$ onto the surface for better interaction with the cement matrix.

Analytical and testing results of post-treated PP fibers are summarized in Table II-A and show that for compared pre-treated fibers (I) all post-treatments are associated with an increase in surface energy; (2) with exception of a few samples (highly phosphonylated and post-treated with the epoxy primer, hexanediamine, and HEMA), have higher tensile strength values but no trend in the percent elongation was discernible; and (3) the phosphonylation level has a pronounced effect on the contribution of the post-treatment to the surface and bulk properties of the fibers. For the highly phosphonylated fibers with microporous surfaces, the unexpectedly high tensile strength values of the post-treated fibers may be attributed to both mechanical binding and/or ionic and covalent crosslinking of the surface and subsurface components of these fibers.

Analytical and testing results of post-treated UHMW-PE fibers are summarized in Table II-B. These results show that compared with pre-treated fibers (I) certain lightly phosphonylated samples exhibit a noticeable increase in surface energy due to post-treatment, and (2) most post-treated fibers have higher tensile strength.

TABLE II-A

Tensile Properties and Surface Energy Data of Phosphonylated and Post-Treated PP Fibers

| Fiber of Ex. No. | Surface Energy (dyne/cm) | % Elongation at Break | Tensile Strength (MPa) |
|---|---|---|---|
| PP Control | 30.5 | 40.2 ± 4.9 | 185 ± 25 |
| 1 | 38.5 | 24.5 ± 1.9 | 143 ± 11 |
| 2 | 31.8 | 37.5 ± 1.2 | 178 ± 26 |
| 3 | 41.6 | 19.9 ± 6.2 | 168 ± 3 |
| 4 | 38.4 | 32.8 ± 2.3 | 222 ± 17 |
| 5 | 37.4 | 35.0 ± 1.0 | 215 ± 4 |
| 6 | 36.6 | 31.8 ± 0.5 | 229 ± 4 |
| 7 | 32.8 | 25.0 ± 4.8 | 164 ± 16 |
| 8 | 34.8 | 41.0 ± 1.9 | 234 ± 12 |
| 9 | 32.4 | 26.1 ± 7.0 | 173 ± 31 |
| 10 | 41.0 | 50.2 ± 5.0 | 224 ± 10 |

TABLE II-B

Tensile Properties and Surface Energy Data of Phosphonylated and Post-Treated UHMW-PE Fiber

| Fiber Designation | Surface Energy (dyne/cm) | % Elongation at Break | Tensile Strength (GPa) |
|---|---|---|---|
| PE Control | 37.7 | 11.4 ± 0.9 | 2.76 ± 0.11 |
| PE Pretreat | 32.0 | 9.4 ± 1.3 | 1.65 ± 0.18 |
| 11 | 34.0 | 4.2 ± 0.4 | 0.97 ± 0.09 |
| 12 | 32.3 | 7.2 ± 0.9 | 1.65 ± 0.18 |
| 13 | 42.5 | 9.5 ± 2.3 | 1.16 ± 0.17 |
| 14 | 40.2 | 14.6 ± 1.7 | 1.81 ± 0.14 |
| 15 | 32.3 | 4.5 ± 0.4 | 0.61 ± 0.08 |
| 16 | 31.5 | 7.0 ± 0.5 | 1.76 ± 0.06 |
| 17 | 29.4 | 9.5 ± 1.6 | 1.96 ± 0.26 |
| 18 | 32.2 | 9.8 ± 0.7 | 2.21 ± 0.16 |
| 19 | 29.5 | 9.6 ± 1.4 | 2.01 ± 0.10 |
| 20 | 30.1 | 13.3 ± 3.9 | 2.15 ± 0.17 |

Unidirectional fiber-reinforced composite test specimens were prepared in open-ended forms measuring 53.7×9.7×6.7 mm³ (l×w×h). The forms were covered with Teflon® FEP film (Bytac) and sprayed with Fluoroglide® dry film lubricant (Norton) to insure easy removal of samples. Fibers which had been phosphonylated and post-treated as set forth in Tables I-A and I-B, above, were strung lengthwise down the molds, pulled taut, and secured in place. The fibers were positioned approximately 1 mm above the base of the form. Yarn strands were spread across the width of the sample cavity to enhance individual fiber coverage by the matrix. Eight yarn strands per sample were strung for epoxy and PMMA composites; four strands per sample were used for cement composites. Once the fibers were positioned, plaster of Paris was used to seal the ends of the mold.

Epoxy, PMMA, and cement were prepared as described above and poured into the molds over the fibers. Any large, entrapped bubbles were expelled from the samples using a needle. All samples were removed from the molds after approximately 15 hours setting time. PMMA and epoxy samples were stored under vacuum, and cement samples were submerged in water.

After two days under vacuum, PMMA and epoxy samples were sanded down to a sample thickness of 2 to 3 mm. Sanding was necessary as the samples were prepared thicker than required due to evaporation and shrinkage considerations. The samples were sanded on their top side only. After sanding, the sample dimensions and weight were measured and recorded, and the samples were returned to vacuum. The samples were tested in flexure four days after being poured into the forms.

The cement samples were removed from water six days after they were poured into the molds. After drying overnight, the samples dimension and weight were measured and recorded. The samples were tested in flexure seven days after being poured into the forms.

Initially, evaluation of the fiber-matrix bond was attempted using yarns embedded in test plugs for pull-out tests. Various combinations of plug thickness and single and multiple yarn strands were tested, however, in all cases, the fibers failed before pulling out of the matrix. After several trials, a decision was made to proceed with three point bend testing of unidirectional composites for fiber-matrix bond evaluation.

Accordingly, the samples were tested on an 858 Mini-bionix (MTS) with a Lab View v 3.11 data acquisition program. The test span of the samples was 40 mm. A displacement rate of −0.10 mm/sec was used for the epoxy and PMMA composites and −0.05 mm/sec was used for the cement composites. When testing the epoxy and PMMA composites, care was taken to orient the samples such that the sanded surface was under compression. Load versus displacement curves were captured for each test. Six samples were tested for each fiber-matrix combination.

The tensile strength of the samples was calculated according to the equation:

$$\sigma_{max} = 3\ PS/2a^2 b$$

where:

$\sigma_{max}$ = maximum tensile stress;

P = applied load at failure;

S = span;

a = sample thickness;

b = sample width.

The energy to failure of the samples was calculated as the area under the stress versus displacement curve. Areas were calculated by trapezoidal numerical integration using Kaleida Graph v 3.0.

PP Composites

The 3-point bend flexural data of three types of PP reinforced composites (epoxy, PMMA, and cement) are summarized in Table III-A. The results for the individual systems are discussed below in terms of maximum normal stress (or tensile strength, $\sigma_{max}$). Due to differences in test specimens, thickness, and, hence, volume, and fiber loading, the $\sigma_{max}$ values were normalized for a volume fraction. Comparison of the energy-to-fail (E) for representative samples made from modified and unmodified fibers were made in terms of the area under the stress-strain curve and relevance to improvement due to surface modification is addressed. Regardless of the variable effects of the surface phosphonylation level on eventual composite properties, low-level phosphonylation was generally associated with more desirable performance.

TABLE III-A

Three Point Bend Flexural Data of Polypropylene Fiber-Reinforced Epoxy, PMMA, and Cement Composites[a]

| Fiber Used* | $V_f$[b] | $\sigma_{max}$[c](Mpa) | $\sigma_{max}/V_f$ (Mpa) | $E$[d] (Pa · mm) | $E/V_f$ (Pa · mm) |
|---|---|---|---|---|---|
| Epoxy Composites | | | | | |
| PP Control | 0.021 | 75.3 ± 7.2 | 3,560 ± 682 | 20.3 ± 7.4 | 937 ± 300 |
| Ex. 1 | 0.022 | 74.8 ± 3.4 | 3,425 ± 823 | 23.6 ± 1.0 | 1,085 ± 283 |
| Ex. 2 | 0.022 | 68.0 ± 8.5 | 3,266 ± 774 | 11.6 ± 10.3 | 521 ± 411 |
| Ex. 3 | 0.013 | 73.1 ± 5.7 | 5,701 ± 441 | 12.8 ± 8.4 | 1,007 ± 696 |
| Ex. 4 | 0.015 | 84.1 ± 11.2 | 5,594 ± 1225 | 11.2 ± 3.7 | 720 ± 148 |
| Ex. 7 | 0.016 | 72.0 ± 5.2 | 4,407 ± 377 | 12.3 ± 2.0 | 755 ± 156 |
| Ex. 8 | 0.017 | 73.6 ± 5.7 | 4,524 ± 443 | 15.0 ± 6.1 | 913 ± 374 |
| PMMA Composites | | | | | |
| PP Control | 0.014 | 73.1 ± 3.4 | 5,135 ± 417 | 10.2 ± 5.8 | 717 ± 409 |
| Ex. 1 | 0.015 | 79.5 ± 2.6 | 5,494 ± 139 | 17.2 ± 4.5 | 1,181 ± 283 |
| Ex. 2 | 0.014 | 76.7 ± 6.5 | 5,294 ± 358 | 9.9 ± 7.3 | 677 ± 508 |
| Ex. 7 | 0.014 | 68.2 ± 7.5 | 4,724 ± 623 | 8.1 ± 7.8 | 568 ± 555 |
| Ex. 8 | 0.014 | 87.2 ± 7.1 | 6,366 ± 553 | 14.6 ± 7.0 | 1,093 ± 578 |
| Ex. 9 | 0.013 | 80.1 ± 6.6 | 6,189 ± 296 | 14.8 ± 5.7 | 1,156 ± 477 |
| Ex. 10 | 0.013 | 82.3 ± 7.7 | 6,297 ± 452 | 9.2 ± 5.1 | 689 ± 351 |
| Cement Composites | | | | | |
| PP Control | 0.0037 | 0.66 ± 0.23 | 174 ± 34 | 2.9 ± 2.7 | 784 ± 682 |
| Ex. 1 | 0.0036 | 4.6 ± 0.3 | 1,258 ± 84 | 0.3 ± 0.07 | 86 ± 19 |
| Ex. 2 | 0.0035 | 4.7 ± 0.3 | 1,366 ± 108 | 0.7 ± 0.60 | 186 ± 167 |
| Ex. 5 | 0.0033 | 3.1 ± 1.3 | 947 ± 480 | 1.9 ± 0.80 | 535 ± 182 |
| Ex. 6 | 0.0032 | 4.5 ± 0.4 | 1,436 ± 110 | 1.0 ± 0.60 | 304 ± 172 |

[a]Values reported in the table are averages ± standard deviations.
[b]Average Fiber Volume Fraction
[c]Tensile Strength
[d]Area under the Normal Stress vs. Displacement curve PP-Epoxy Composites The normalized $\sigma_{max}$ values of composite test specimens made with about 1% to 2% (by volume) fiber loading indicate that (1) mere surface phosphonylation with —P(O ((OH)$_2$ groups does not result in improving $\sigma_{max}$; and (2) post-treatment of the phosphonylated surface with an epoxy primer or hexanediamine led to substantial improvement in the value of $\sigma_{max}$ (differences from control were statistically significant with a 95% confidence level). These results verify that with physicochemically intimate interfacing and development of a good adhesive joint in composites leads to significant improvement in mechanical properties at exceptionally low loading of surface-modified fibers. This is well illustrated in fibers where the surface is post-treated with an epoxy primer or hexanediamine. In the case of the epoxy primer, it is suggested that the low viscosity primer solution wets the fiber surface and allows the epoxy to adhere to the polar phosphonic acid groups or even chemically bind to them through phosphonate linkages. As the composite is assembled, there will be practically no phase boundary between the epoxy primer and epoxy matrix itself. In the case of hexanediamine, it binds covalently through phosphonamide linkages (or ionically to inadvertently hydrolyzed P(O)Cl$_2$ groups) on the PP surface and participates in the curing scheme as an amine. The fact that mere phosphonylation and its extent as well as associated surface microporosity do not affect the composite properties directly can be related to the difficulty of achieving adequate physical contact between the viscous epoxy matrix and fiber surface. Hence, anchoring of the epoxy component to the fiber and mechanical interlocking with the microporous surface would not be realized to any significant extent without the appropriate post-treatment.

PP-Poly(methyl methacrylate) Composites

The normalized $\sigma_{max}$ values of composite test specimens made with about 1.0% to 1.5% (by volume) fiber loading indicate that (1) effect of the post-treatment of lightly phosphonylated fibers is discernible, and effectiveness of such treatment in increasing the tensile strength declined from covalent binding through HEMA to covalently (ionically) binding via hexanediamine; (2) the effect of the post-treatments on the composites' energy-to-fail (E) parallels, in most cases, their effect on $\sigma_{max}$; and (3) the significant increases in the $\sigma_{max}$ values for five out of six samples were associated with statistically significant differences from control samples with a 95% confidence level. These results (1) support the hypothesis that having physically and/or interactive groups or chains on the fiber surface that are compatible with PMMA or its monomer do improve the flexural properties (in terms of $\sigma_{max}$) of the composite at exceptionally low fiber loading; (2) are in concert with the thesis that surface microporosity can be most effective in contributing to mechanical interlocking and have improved composite properties when the curing matrix is low viscosity liquid as in the PMMA matrix; and (3) using modified PP fibers can produce PMMA composites with higher tensile and energy-to-fail (and in effect, impact toughness of impact strength) at very low fiber loading as compared with composites based on unmodified fibers.

UHMW-PE Composites
PP-Cement Composites

The normalized $\sigma_{max}$ and E values of composite test specimens assembled with about 0.3% and 0.4% (by volume) fiber loading indicate that (1) a significant effect of surface activation on $\sigma_{max}$—in all cases, differences from the control were statistically significant with a 95% confidence level; and (2) improvements in $\sigma_{max}$ due to surface phosphonylation exceeded expectations, but the E values were surprisingly low and inconsistent. In spite of the exceptionally low fiber loading, these results support the feasibility of using activated PP fibers to produce high-impact-strength cement composites.

The 3-point bend flexural data of three types of UHMW-PE-reinforced composites (epoxy, PMMA, and cement) are summarized in Table III-B. The results for the individual systems are discussed in terms of maximum normal stress (or tensile strength $\sigma_{max}$). Due to the difference in test-specimens' thickness and, hence, volume and fiber-loading, the $\sigma_{max}$ values were normalized for volume fraction. The energy-to-fail (E) values of representative samples made from modified and unmodified fibers were calculated and relevance to improvement to fracture toughness due to surface modification is addressed. In spite of the variable effects of the surface phosphonylation level on eventual composite properties, low-level phosphonylation was generally associated with more desirable performance in epoxy and PMMA systems, but not the cement composites. Effect of phosphonylation level and composite performance in the cement system was unique.

addition to being in concert with most of the pertinent observations noted for the PP-composites, these results (1) may suggest that the adhesive joint between the functionalized surface and epoxy matrix may exceed the cohesive strength of the weakened subsurface of highly phosphonylated fibers; and (2) modified UHMW-PE fibers can be used to produce epoxy composites with higher tensile and toughness, or impact, strength at very low fiber loading, as compared to composites based on unmodified fibers.

UHMW-PE-PMMA Composites

The normalized $\sigma_{max}$ values of composite test specimens assembled using about 2.5% to 4.5% (by volume) fiber loading indicate that (1) contrary to what was noted in PP composites, the effectiveness of post-treatment on $\sigma_{max}$ and E is generally low and limited practically to highly phosphonylated surfaces that are post-treated with HEMA and hexanediamine; (2) matrix residual fragments can be recog-

TABLE III-B

Three Point Bend Flexural Data of UHMW-PE Fiber-Reinforced Epoxy, PMMA, and Cement Composites[a]

| Fiber Used* | $V_f^b$ | $\sigma_{max}^c$ (Mpa) | $\sigma_{max}/V_f$ (Mpa) | $E^d$ (Pa · mm) | $E/V_f$ (Pa · mm) |
|---|---|---|---|---|---|
| Epoxy Composites | | | | | |
| PE Pretreat | 0.046 | 77.5 ± 16.9 | 1,569 ± 427 | 27.2 ± 6.3 | 542 ± 114 |
| Ex. 11 | 0.040 | 80.4 ± 3.2 | 2,015 ± 366 | 22.6 ± 9.2 | 540 ± 174 |
| Ex. 12 | 0.035 | 76.7 ± 16.8 | 1,825 ± 133 | 23.6 ± 16.4 | 610 ± 492 |
| Ex. 13 | 0.028 | 83.1 ± 13.5 | 2,965 ± 602 | 25.9 ± 19.7 | 880 ± 615 |
| Ex. 14 | 0.034 | 74.9 ± 6.4 | 2,179 ± 531 | 16.9 ± 6.3 | 478 ± 146 |
| Ex. 17 | 0.028 | 117 ± 8.9 | 5,026 ± 628 | 17.9 ± 3.7 | 767 ± 159 |
| Ex. 18 | 0.023 | 89.1 ± 10.8 | 3,787 ± 693 | 17.0 ± 8.3 | 703 ± 336 |
| PMMA Composites | | | | | |
| PE Pretreat | 0.037 | 76.9 ± 9.7 | 2,066 ± 288 | 9.8 ± 5.3 | 261 ± 134 |
| Ex. 11 | 0.029 | 45.7 ± 13.3 | 1,592 ± 416 | 30.6 ± 14.9 | 1,058 ± 455 |
| Ex. 12 | 0.039 | 58.0 ± 7.3 | 1,470 ± 177 | 27.3 ± 6.4 | 694 ± 165 |
| Ex. 17 | 0.027 | 46.7 ± 6.5 | 2,096 ± 138 | 25.6 ± 13.2 | 1,161 ± 637 |
| Ex. 18 | 0.024 | 50.1 ± 7.8 | 2,040 ± 313 | 18.5 ± 2.6 | 753 ± 102 |
| Ex. 19 | 0.030 | 44.8 ± 3.7 | 1,525 ± 182 | 27.2 ± 6.1 | 918 ± 177 |
| Ex. 20 | 0.028 | 46.8 ± 7.4 | 1,671 ± 285 | 28.3 ± 19.5 | 1,012 ± 696 |
| Cement Composites | | | | | |
| PE Pretreat | 0.0069 | 5.0 ± 0.5 | 719 ± 64 | 0.46 ± 0.09 | 66 ± 14 |
| Ex. 11 | 0.0081 | 9.5 ± 1.7 | 1,170 ± 234 | 10.2 ± 4.4 | 1,280 ± 610 |
| Ex. 12 | 0.0078 | 8.3 ± 4.5 | 1,020 ± 442 | 5.3 ± 3.1 | 674 ± 432 |
| Ex. 15 | 0.012 | 13.1 ± 2.0 | 1,106 ± 227 | 2.8 ± 0.81 | 237 ± 67 |
| Ex. 16 | 0.0070 | 5.8 ± 1.9 | 793 ± 234 | 3.7 ± 3.7 | 504 ± 489 |

[a]Values reported in the table are averages ± standard deviations.
[b]Average Fiber Volume Fraction
[c]Tensile Strength
[d]Area under the Normal Stress vs. Displacement curve UHMW-PE-Epoxy Composites The normalized $\sigma_{max}$ values of composite test specimens made with about 1% to 5% (by volume) fiber loading indicate that (1) surface phosphonylation with and without post-treatment using the epoxy primer and hexanediamine do increase the tensile strength of the respective composites, as compared to those based on unmodified (pre-treated) fibers; the significant increases in the $\sigma_{max}$ value of three out of six samples were associated with statistically significant differences from control samples with a 95% confidence level; (2) the noted effect of surface modified fibers on $\sigma_{max}$ is paralleled by similar increases in the energy-to-fail (E); (3) in the SEM micrographs, residual epoxy fragments remaining attached to the fibers in a fractured sample of the worse case composite of surface functionalized fibers exceed those associated with unmodified fibers; and (4) cohesive failure of the uppermost surface of the fibers may have taken place as depicted in the SEM micrographs. In nized in the SEM micrographs of one of the worst cases of PMMA composites; (3) post-treatment of lightly functionalized surfaces with hexanediamine is a most effective protocol used so far in assembling PMMA composites; and (4) the effect of functionalization and post-treatment on E, and hence toughness, is unexpectedly high. These results reflect the significance of (1) anchoring chemical functionalities onto the surface that can covalently bind to the curing matrix is a key strategy for achieving high toughness composites; (2) the importance of allowing early matrix curing about the fiber surface by providing surface-anchors that can react with the matrix component; and (3) the feasibility of producing high toughness composites of PMMA using very low fiber loading.

UHMW-PE-Cement Composites

The normalized $\sigma_{max}$ and E values of composite specimens based on about 0.7% to 1.2% (by volume) fiber loading indicate that (1) contrary to the case of organic-based composites, the high phosphonylation is more effective in achieving high tensile strength in cement composites: (2) high surface-phosphonylation can be more effective without further treatment with CaO; (3) both phosphonylation and post-treatment result in noticeable increases in both $\sigma_{max}$ and E in two out of the four samples examined; the increases in $\sigma_{max}$ were associated with statistically significant differences from control with a 95% confidence level; and (4) residual segments of the cement matrix remain attached to the fiber surface of fractured representative specimens (phosphonylated and post-treated with CaO) of a cement composite as determined by SEM. These results (1) demonstrate the feasibility of using functionalized UHMW-PE fibers, with or without further treatments with CaO, at exceptionally low loading to produce high-strength, high-impact toughness cement composites.

Fabric-Reinforced Composites

Composites also were made with ultra-high molecular weight polyethylene fabric as a filler in both methacrylate and epoxy matrices. Spectra 900 fabric, an open weave, woven fabric supplied by Allied Signal was employed in untreated form as a control and phosphonylated and post-treated with hexanediamine as with the yarn noted above. Unlike the yarn-filled composites, the present fabric-based composites contained approximately 30 percent by weight UHMW-PE fabric filler. The results are set forth in Table IV, below.

TABLE IV

Three Point Bend Flexural Data of UHMW-PE Fabric-Reinforced Epoxy And MMA* Composites

| Sample | Max. Strength (MPa) | Modulus (GPa) |
| --- | --- | --- |
| Methyl methacrylate matrix and untreated fabric | 74.11 ± 4.22 | 2.19 ± 0.12 |
| Methyl methacrylate matrix and treated Fabric | 88.13 ± 4.56 | 2.49 ± 0.13 |
| Epoxy matrix and untreated fabric | 76.52 ± 11.71 | 2.20 ± 0.14 |
| Epoxy matrix treated Fabric | 94.81 ± 14.26 | 2.55 ± 0.23 |

*A methacrylate formulation is based on methyl methacrylate, a methacrylate crosslinking agent, and photosensitizer for preparing photocurable composites is used.

Various modifications and alterations that do not depart from the scope and spirit of this invention will become apparent to those skilled in the art. This invention is not to be unduly limited to the illustrative embodiments set forth herein.

We claim:

1. A composite comprising an organic resin matrix and a filler, said filler comprising
    a polyolefin fiber construct, said polyolefin selected from the group consisting of polypropylene and ultra-high molecular weight polyethylene, said polyolefin fiber construct having functional moieties covalently bonded thereto, the functional moieties being selected from the group consisting of phosphonyl moieties and sulfonyl moieties,
    and a bridging agent bonded to the functional moieties.

2. The composite set forth in claim 1 wherein said organic resin comprises an acrylic resin.

3. The composite set forth in claim 1 wherein said organic resin comprises an epoxy resin.

4. The composite set forth in claim 1 wherein the bridging agent is intrinsically miscible in the organic resin matrix.

5. The composite set forth in claim 1 wherein the bridging agent comprises an organic diamine.

6. The composite set forth in claim 2 wherein the bridging agent comprises an acrylate.

7. The composite set forth in claim 3 wherein the bridging agent comprises an epoxy.

8. The composite set forth in claim 1 wherein the filler comprises less than about 35% by weight of the composite.

9. The composite set forth in claim 1 wherein the filler comprises less than about 20% by weight of the composite.

10. The composite set forth in claim 1 wherein the filler comprises less than about 10% by weight of the composite.

11. A composite comprising a cement matrix and a filler, said filler comprising a polyolefin fiber construct, said polyolefin selected from the group consisting of polypropylene and ultra-high molecular weight polyethylene, said polyolefin fiber construct having functional moieties covalently bonded thereto, the functional moieties being selected from the group consisting of phosphonyl moieties and sulfonyl moieties.

12. The composite set forth in claim 11 further including a bridging agent bonded to the functional moieties.

13. The composite set forth in claim 12 wherein said bridging agent comprises a multivalent metal ion.

14. The composite set forth in claim 11 wherein the filler comprises less than about 35% by weight of the composite.

15. The composite set forth in claim 11 wherein the filler comprises less than about 20% by weight of the composite.

16. The composite set forth in claim 11 wherein the filler comprises less than about 10% by weight of the composite.

17. A method for making a composite comprising the steps of
    (a) providing an organic resin matrix
    (b) providing a filler comprising a polyolefin fiber construct, said polyolefin selected from the group consisting of polypropylene and ultra-high molecular weight polyethylene,
    (c) functionalizing the surface of the polyolefin fiber construct by covalently bonding functional moieties thereto, said functional moieties selected from the group consisting of phosphonyl moieties and sulfonyl moieties;
    (d) post-treating the polyolefin fiber construct by bonding a bridging agent to the functional moieties; and
    (e) incorporating the functionalized and post-treated polyolefin fiber construct into the organic resin matrix.

18. The method set forth in claim 17 wherein the organic resin comprises an acrylic resin.

19. The method set forth in claim 17 wherein the organic resin comprises an epoxy resin.

20. The method set forth in claim 17 wherein the bridging agent comprises an organic diamine.

21. The method set forth in claim 18 wherein the bridging agent comprises an acrylate.

22. The method set forth in claim 19 wherein the bridging agent comprises an epoxy.

23. A method for making a composite comprising the steps of
    (a) providing a cement matrix;
    (b) providing a filler comprising a polyolefin fiber construct, said polyolefin selected from the group consisting of polypropylene and ultra-high molecular weight polyethylene,
    (c) functionalizing the surface of the polyolefin fiber construct by covalently bonding functional moieties thereto, said functional moieties selected from the group consisting of phosphonyl moieties and sulfonyl moieties; and (d) incorporating the functionalized polyolefin fiber construct into the cement matrix.

24. The method set forth in claim 23 further including the step of post-treating the polyolefin fiber construct by bonding a bridging agent to the functional moieties subsequent to the step of functionalizing the surface of the polyolefin fiber construct and prior to the step of incorporating the fiber construct into the cement matrix.

25. The method set forth in claim 24 wherein said bridging agent comprises a multivalent metal ion.

* * * * *